United States Patent
Vito (10) Patent No.: US 9,192,958 B2
(45) Date of Patent: Nov. 24, 2015

(54) LIQUID DISPENSER WITH INTERCHANGEABLE HEADS AND EXTENSION POLES

(71) Applicant: John Vito, Dalton, PA (US)

(72) Inventor: John Vito, Dalton, PA (US)

(*) Notice: Subject to any disclaimer, the term of this patent is extended or adjusted under 35 U.S.C. 154(b) by 308 days.

(21) Appl. No.: 13/904,103

(22) Filed: May 29, 2013

(65) Prior Publication Data

US 2013/0343802 A1    Dec. 26, 2013

Related U.S. Application Data

(60) Provisional application No. 61/689,222, filed on Jun. 1, 2012.

(51) Int. Cl.
| | |
|---|---|
| B43K 5/06 | (2006.01) |
| B05C 17/00 | (2006.01) |
| F16L 21/00 | (2006.01) |
| B05C 17/03 | (2006.01) |

(52) U.S. Cl.
CPC ............ *B05C 17/00* (2013.01); *B05C 17/0325* (2013.01); *F16L 21/00* (2013.01); *B05C 17/0308* (2013.01)

(58) Field of Classification Search
CPC .. B05C 17/0308; B05C 17/0325; F16L 21/00
USPC ........... 401/171, 173, 174, 176, 177; 285/399
See application file for complete search history.

(56) References Cited

U.S. PATENT DOCUMENTS

| | | | |
|---|---|---|---|
| 4,695,176 A | 9/1987 | Simonette | |
| 4,732,503 A * | 3/1988 | Bader et al. | 401/197 |
| 4,997,302 A | 3/1991 | Simonette | |
| 5,881,601 A * | 3/1999 | Hammer | 74/422 |
| 6,010,267 A | 1/2000 | Vito | |
| 6,547,469 B2 | 4/2003 | Vito | |
| 6,692,171 B2 | 2/2004 | Vito | |
| 7,556,447 B2 * | 7/2009 | Bruggeman et al. | 401/197 |
| 7,682,098 B2 * | 3/2010 | Sandahl et al. | 401/170 |
| 8,821,058 B2 * | 9/2014 | Walker et al. | 401/219 |

* cited by examiner

*Primary Examiner* — Jennifer C Chiang
(74) *Attorney, Agent, or Firm* — Charles Riddle, Esq; Riddle Patent Law, LLC (57) ABSTRACT

A liquid dispenser comprises a fluid transfer body, a reservoir with plunger, and an extender selectively attachable to the reservoir; the elongated tube shaped member has at least one wall that forms a forward rim and extends in a tubular fashion to a rearward end; the at least one wall also forms a longitudinal slot for receiving the handle of the plunger, or a lever attached to said handle; and the slot is disposed to allow the handle or lever to travel when a user pushes the handle of the plunger towards or away from the fluid transfer body end of the elongated reservoir.

19 Claims, 8 Drawing Sheets

LIQUID DISPENSER WITH INTERCHANGEABLE HEADS AND EXTENSION POLES

This application claims priority to U.S. Provisional Patent Application No. 61/689,222 filed on Jun. 1, 2012 and incorporates the same by reference the entire disclosure as if set forth herein in its entirety.

BACKGROUND OF INVENTION a. Field of Invention

The invention relates generally to paint sticks and devices for applying a liquid to a surface utilizing a piston operating within a reservoir. The invention relates generally to extendable devices and extension devices used to broaden the range of usability of existing paint sticks and similar liquid delivery devices.

b. Description of Related Art

The following patents are representative of the field pertaining to the present invention:

U.S. Pat. No. 4,695,176 to Simonette et al. describes a found applicator handle for providing a continuous supply of a liquid coating to an applicator head for application on to a surface. The fountain applicator handle includes an elongated hollow reservoir with sliding displacement pistons disposed therein. A valve body is attached thereto and adapted for attachment to a coating supply, with the valve body allowing the communication of the coating into the reservoir while preventing the outflow of the coating to the applicator, and controllably communicating the coating from the reservoir to the applicator.

U.S. Pat. No. 4,732,503 to Bader et al. describes an apparatus for applying a liquid to a surface comprising an applicator and a body member. The body member includes a piston member for exerting a force on the fluid in the reservoir, and two channels, a first channel being in fluid communication with a channel in the applicator and a second channel being in fluid communication with a area outside the body member. The body member further including a valve.

U.S. Pat. No. 4,997,302 to Simonette describes a liquid dispenser adapted for use to apply liquid coating. The dispenser has a first tubular housing in which is slide ability received a second tubular housing.

U.S. Design Pat. No. D551,819 discloses a fluid reservoir pole with dispensing wash head and squeegee.

U.S. Pat. No. 7,556,447 B2 to Bruggeman et al. discloses a metered twist paint stick. The metering device for incrementally metering paint on to the applicator from the tube. The metering device has a plunger reciprocating meter within the tube, with the plunger having a handle. The plunger can either be incrementally advanced within the tube by rotating the handle. Or, the plunger can be manually refracted within the tube to fill the tube with paint and manually advanced within the tube to dispense the paint. The plunger is helically grooved along its length and a converter translates rotation of the handle into linear motion of the plunger, there by advancing the plunger within the tube.

U.S. Pat. No. 7,682,098 B2 to Sandhal et al. discloses a two stage double piston manual liquid applicator. A liquid applicator having a collapsible liquid reservoir with an elongated outer chamber wall having a characteristic length, and a liquid delivery piston having a length substantially equal to the characteristic length, were in the piston is telescopically received in the outer chamber wall and an elongated intermediate chamber wall having a length substantially equal to the characteristic length and were in the intermediate chamber wall is telescopically received in the outer chamber wall located circumferentially intermediate the piston and the outer chamber wall, were in the liquid reservoir an piston maybe telescopically expanded to either a fully expanded condition were in the combined length of the liquid reservoir and piston is about three times the characteristic length, or a partially expanded intermediate condition were in the combined length of the liquid reservoir and piston is substantially less then half the length of the liquid reservoir and piston in fully expanded condition.

U.S. Pat. No. 6,692,171 B2 to Vito et al. describes a squeegee with squeegee handle and remote spraying device, includes a squeegee section having an enclosed container for holding liquid, a sprayer head, which is in connection with the squeegee section, and a surface extending in a lengthwise direction. The enclosed container has a threaded neck. The sprayer head has a threaded cap adapted for engaging the threaded neck, as well as a dispensing means for dispensing the liquid. The dispensing means includes a trigger being in connection with a conduit, a nozzle at an end of the sprayer head, and pressure inducing means for inducing a pressure change in the conduit so as to draw spraying agent into the conduit and out of the nozzle. The conduit extends through the threaded cap and into the enclosed container. There is also a squeegee blade attached to the sprayer head and being nearly perpendicular to the surface of said enclosed container. In preferred embodiments, an extended handle further includes a plurality of sections in which each section extends to allow for longer reaching range.

U.S. Pat. No. 6,547,469 B2 to Vito describes a spray squeegee having automatic recipient surface wetting mechanism with extension and remote triggering system, which includes a squeegee section having an enclosed container for holding liquid, a sprayer head, which is in connection with the squeegee section, and a surface extending in a lengthwise direction. The enclosed container has a threaded neck. The sprayer head has a threaded cap adapted for engaging the threaded neck, as well as dispensing means for dispensing the liquid. There is a squeegee blade and at least one wiping mechanism. One wiping means includes a wiping support that a plurality of nozzles for wetting the wiping mechanism and is located on a side opposite the blade. Another wiping means, which may be on the blade side or the first wiping mechanism side, is it tillable and includes a clamp for holding a wiping material.

U.S. Pat. No. 6,010,267 to Vito describes an extended squeegee and fluid delivery system for cleaning in places that are of high elevation. A squeegee is used in connection with an extended handle. The spray system has a pump that delivers a cleaning agent through a conduit in connection with the squeegee. There is a trigger in connection with the spray bottle and near the end of the handle where the user is holding the handle. The user may then deliver cleaning agent out the nozzle by squeezing on a trigger or pull cord in connection with the handle. The handle of the squeegee may be made hollow in order to deliver the cleaning agent from the source of the agent to the nozzle in connection with the squeegee. Notwithstanding the prior art discussed above, which is hereby incorporated by reference, the present invention is neither taught nor rendered obvious thereby.

Prior art paint applicators and liquid dispensers have been commercially successful. However, the plunger or piston handle is not truly a structural handle that is effectively used to operate the applicator or dispenser. The handle portion is difficult to grasp and use when operating the device. As a user pushes on the handle to move the device to apply the paint or liquid, the user also inadvertently dispenses the liquid with the same pushing force used to manipulate the roller or other dispensing head. This results in an unintended dispensation of paint or liquid when unneeded for application. Even when a user does use the piston handle to physically move the he paint stick head by grasping the reservoir with one hand and grasping the piston handle with the other, the handle gets shorter and shorter as the piston moves forward to dispense the liquid from the reservoir. For example, when the paint volume in the reservoir is exhausted, the user is left to paint with a stub or a fraction of the length the user has when the reservoir is full and the piston is fully pulled outward. Similarly, in tight places such as closets, bathrooms, and halls, a full paint stick is too long and painting becomes difficult. It is therefore an object of the present invention to provide a device that addresses one or more of the aforementioned, as well as provide a device that allows a user with the flexibility to have an applicator that can be short enough to work in tight places, and can be extended to have a longer reach in bigger areas.

SUMMARY OF INVENTION

A present invention liquid dispenser comprises a fluid transfer body, a reservoir with plunger, and an extender selectively attachable to the reservoir. The fluid transfer body has a head end for delivering fluid at a distal end, a side inlet for filling the liquid dispenser with a fluid, and a reservoir end at a proximal location for attaching the fluid transfer body with the reservoir and for communicating fluid in and out of the reservoir. The reservoir is an elongated tube shaped reservoir having a proximal end and an opposing fluid transfer body end. The elongated tube shaped reservoir is in fluid communication with the fluid transfer body at the reservoir end. The plunger has a fluid contacting end connected to a handle. The fluid contacting end is adapted to sealably fit inside the elongated reservoir tube and travel within the elongated reservoir tube to a.) force fluid to the fluid transfer body when the plunger travels towards the fluid transfer body end or b.) draw fluid from the fluid transfer body when the plunger travels away from the fluid transfer body end. The extender is selectively attachable to the elongated reservoir. The extender is defined by an elongated tube shaped member. The elongated tube shaped member has at least one wall that forms a forward rim and extends in a tubular fashion to a rearward end. The at least one wall also forms a longitudinal slot for receiving the handle of the plunger, or a lever attached to said handle. The slot is disposed to allow the handle or lever to travel when a user pushes the handle of the plunger towards or away from the fluid transfer body end of the elongated reservoir. Wherein, fluid is drawn into the reservoir from a fluid supply through the side inlet by causing the plunger to travel away from the fluid transfer body, and wherein fluid is dispensed by causing the plunger to travel towards the fluid transfer body and out the head end.

In some preferred embodiments of the present invention, the reservoir has a connector at the proximal end and/or the extender has a connector to enable selective attachment and removal of the extender from the elongated reservoir.

In some preferred embodiments, the present invention further includes at least one interchangeable head that is interchangeably connectable to the head end of the fluid transfer body. The at least one interchangeable head is selected from the group consisting of a liquid dispensing brush, a liquid dispensing squeegee, a liquid dispensing mop, a paint dispensing head, and combinations thereof.

In some preferred embodiments, the present invention further includes at least one interchangeable fluid transfer body that is interchangeably connectable to the fluid transfer body end of the reservoir. The interchangeable fluid transfer body has a head fixed to the head end, and the fluid transfer body is selected from the group consisting of a liquid dispensing brush, a liquid dispensing squeegee, a liquid dispensing mop, a paint dispensing head, and combinations thereof.

In some preferred embodiments of the present invention, the fluid transfer body is removably connectable to enable the fluid transfer body to be removed from the fluid transfer body end of the reservoir and replaced with an other fluid transfer body, or to allow the fluid transfer body to be removed from the fluid transfer body end of the reservoir and connected with an other reservoir.

In some preferred embodiments of the present invention, the extender slidably fits around the reservoir allowing a user to selectively set or vary an extender handle length by sliding the extender relative to the reservoir and selectively fixing the extender to the reservoir by a locking mechanism.

In another embodiment of the present invention, there is disclosed an extender for use in extending the length of a paint stick or other stick type liquid dispensing device generally having an elongated tube shaped reservoir in operation with a liquid delivery plunger which travels within the reservoir to fill the reservoir with fluid and/or deliver fluid from the reservoir to a head (such as a roller or sprayer). The liquid delivery plunger is operated by pushing and/or pulling a handle that is connected to the plunger at a proximal end of the reservoir. The handle extends outwardly from and is at least partially transverse to an axis occupied by the reservoir. The extender is defined by an elongated tube shaped member having at least one wall forming a forward rim and extending in a tubular fashion to a rearward end. The at least one wall also forms a longitudinal slot for receiving the handle of the plunger. The slot disposed to allow said handle of the plunger to travel towards or away from the fluid transfer body end of the elongated reservoir when the extender is positioned over the reservoir so to occupy at least part of the reservoir within the at least one wall of the extender.

In another embodiment of the present invention, there is disclosed an extension kit for use in extending the length of a paint stick or other stick type liquid dispensing that is operated by a user pushing and/or pulling a bulb-shaped-handle that is connected to the plunger. The kit includes a bulb-to-lever handle adapter that provides a grip that protrudes outwardly from and is at least partially transverse to an axis occupied by the reservoir. The bulb-to-lever handle adapter is for enabling operation of the plunger by pushing or pulling of the grip and transmitting force from the grip to the bulb-shaped-handle. The extender is as disclosed herein.

In some preferred embodiments of the present invention the bulb-to-lever handle adapter is defined by a bulb shell housing formed from, connected to, or integral with a lever. The bulb shell housing comprising a wall adapted to fit over the bulb-shaped-handle. The lever defined by a protrusion that extends outwardly from the bulb shell housing to extend transversely to the axis of the plunger and reservoir.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

The invention relates generally to paint sticks and devices for applying a liquid to a surface utilizing a piston operating within a reservoir. The invention relates generally to extendable devices and extension devices used to broaden the range of usability of existing paint sticks and similar liquid delivery devices.

Figure 1:
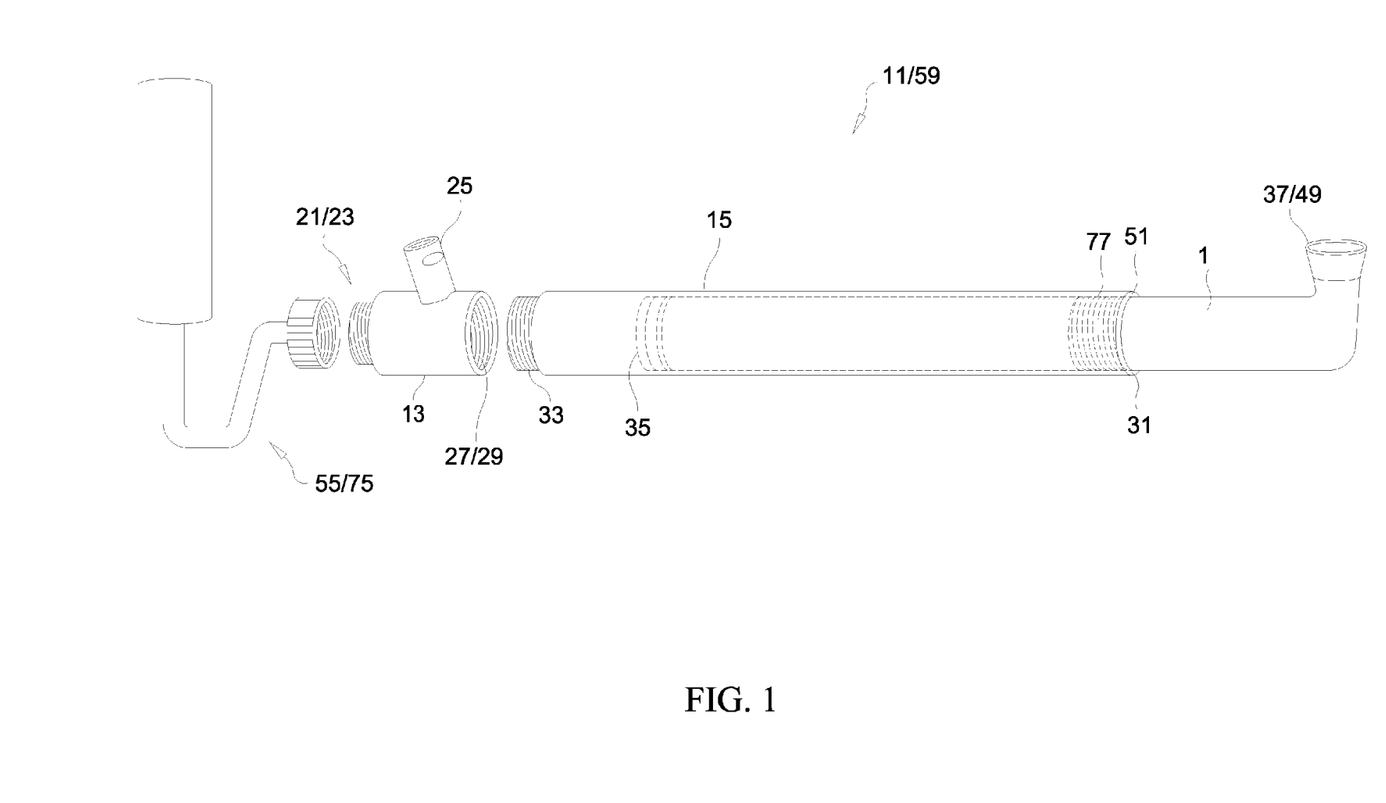
FIG. 1 is an exploded perspective view of the present invention shown with a paint roller as the interchangeable head.
Figure 2:
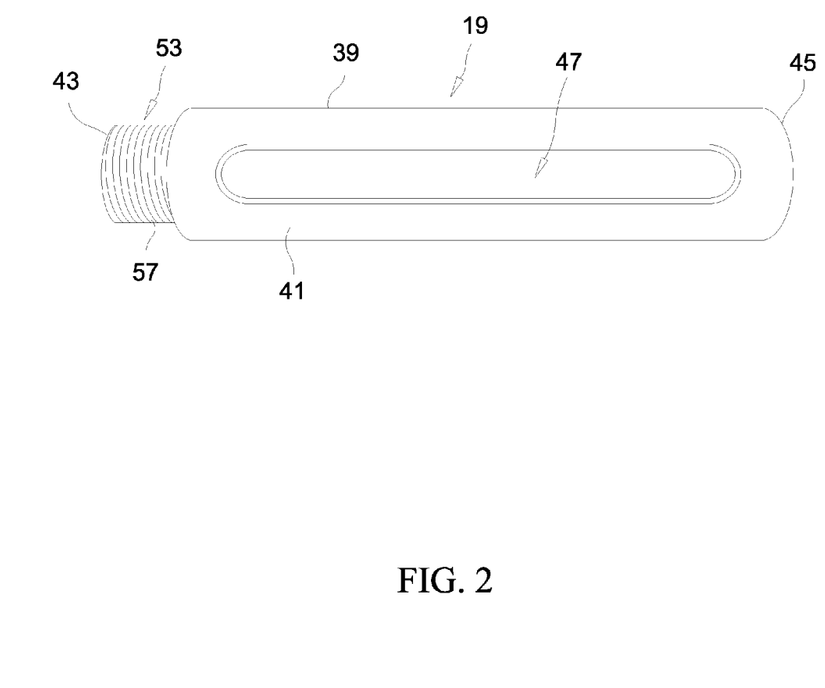
FIG. 2 shows the present invention extender according to an embodiment of the present invention.

Turning to the figures generally, and particularly FIG. 1 and FIG. 2, there is shown a present invention liquid dispenser 11. The liquid dispenser 11 comprises a fluid transfer body 13, a reservoir 15 with plunger 17, and an extender 19 selectively attachable to the reservoir 15. The fluid transfer body 13 has a head end 21 for delivering fluid at a distal end 23, a side inlet 25 for filling the liquid dispenser 11 with a fluid, and a reservoir end 27 at a proximal location 29 for attaching the fluid transfer body 13 with the reservoir 15 and for communicating fluid in and out of the reservoir 15. The reservoir 15 is an elongated tube shaped reservoir 15 having a proximal end 31 and an opposing fluid transfer body end 33. The elongated tube shaped reservoir 15 is in fluid communication with the fluid transfer body 13 at the reservoir end 27. The plunger 17 has a fluid contacting end 35 connected to a handle 37. The fluid contacting end 35 is adapted to sealably fit inside the elongated reservoir 15 and travel within the elongated reservoir 15 to a.) force fluid to the fluid transfer body 13 when the plunger 17 travels towards the fluid transfer body 13 or b.) draw fluid from the fluid transfer body 13 when the plunger 17 travels away from the fluid transfer body 13. The extender 19 is selectively attachable to the elongated reservoir 15.

Referring to FIG. 2, the extender 19 is defined by an elongated tube shaped member 39. The elongated tube shaped member 39 has at least one wall 41 that forms a forward rim 43 and extends in a tubular fashion to a rearward end 45. The at least one wall 41 also forms a longitudinal slot 47 for receiving the handle 37 of the plunger 17, or a lever 49 attached to said handle 37. The slot 47 is disposed to allow the handle 37 or lever 49 to travel when a user pushes the handle 37 of the plunger 17 towards or away from the fluid transfer body end 33 of the elongated reservoir 15. Wherein, fluid is drawn into the reservoir 15 from a fluid supply through the side inlet 25 by causing the plunger 17 to travel away from the fluid transfer body 13, and wherein fluid is dispensed by causing the plunger 17 to travel towards the fluid transfer body 13 and out the head end 21.

In some preferred embodiments of the present invention, the reservoir has a connector 51 at the proximal end 31 and/or the extender 19 has a connection 53 to enable selective attachment and removal of the extender 19 from the elongated reservoir 15. The connecter is one or more of threads, set screws, pop fittings bell and socket fittings, constricting collars, locking rings, gaskets, locking gaskets, and fasteners.

In use with a paint stick as the liquid dispenser 11, for example, a user grasps the reservoir 15 with a forward hand and a rearward hand to apply a coating of paint to a surface. When a surface is beyond reach of the paint stick liquid dispenser 11 while the user grasps the reservoir 15 with the forward and rearward hands, the user attaches the extender 19 to the reservoir end by passing the handle 37 through the slot 47 and connecting the reservoir 15 to the extender 19. The user applies a coating of paint to the surface at an extended reach location by grasping the extender 19 with the forward and/or rearward hands. When using the paint stick liquid dispenser 11 in confined locations such as bathrooms, hallways, or closets, the user may remove the extender 19 to allow the user to operate the liquid dispenser 11 or paint stick to apply the liquid. The extender 19 may also be re-attached as discussed herein, as needed to reach extended reach locations.

The user may add additional liquid from the reservoir to the head end 21 and/or the head 75 by grasping and sliding the handle 37, grip, 65, and/or lever 69 forward in the slot towards the head end while the handle 37, grip, 65, and/or lever 69 is located within the slot of the extender 19. Similarly, additional liquid may be added to the reservoir by sliding the handle 37, grip, 65, and/or lever 69 rearward (away from the head end) while the handle 37, grip, 65, and/or lever 69 is located within the slot of the extender 19.

Figure 4:
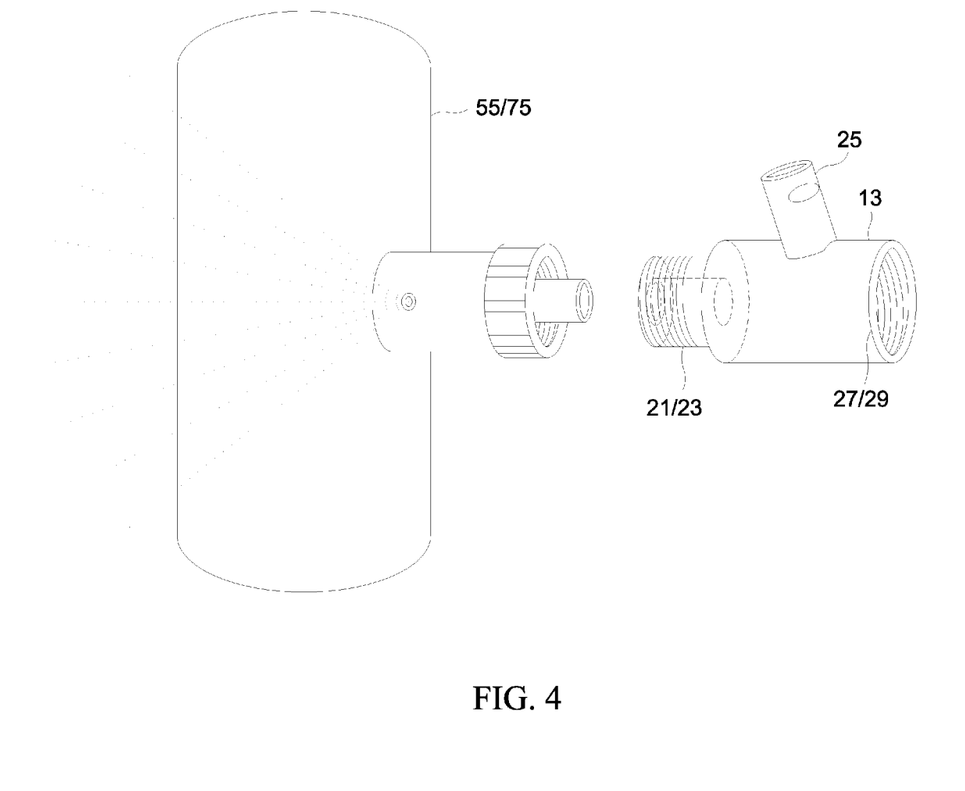
FIG. 4 shows a detachable interchangable fluid transfer body an interchangable head according to an embodiment of the present invention.

Referring, by example to FIGS. 1 and 4, in some preferred embodiments, the present invention further includes at least one interchangeable head 55 that is interchangeably connectable to the head end 21 of the fluid transfer body 13. The at least one interchangeable head 55 is selected from the group consisting of a liquid dispensing brush, a liquid dispensing squeegee, a sprayer, a liquid dispensing mop, a paint dispensing head, and combinations thereof.

In some preferred embodiments, the present invention further includes at least one interchangeable fluid transfer body 13 that is interchangeably connectable to the fluid transfer body end 33 of the reservoir 15. The interchangeable fluid transfer body 13 has a head 75 fixed to the head end 21, and the fluid transfer body 13 is selected from the group consisting of a liquid dispensing brush, a liquid dispensing squeegee, a liquid dispensing mop, a paint dispensing head, and combinations thereof.

Figure 3:
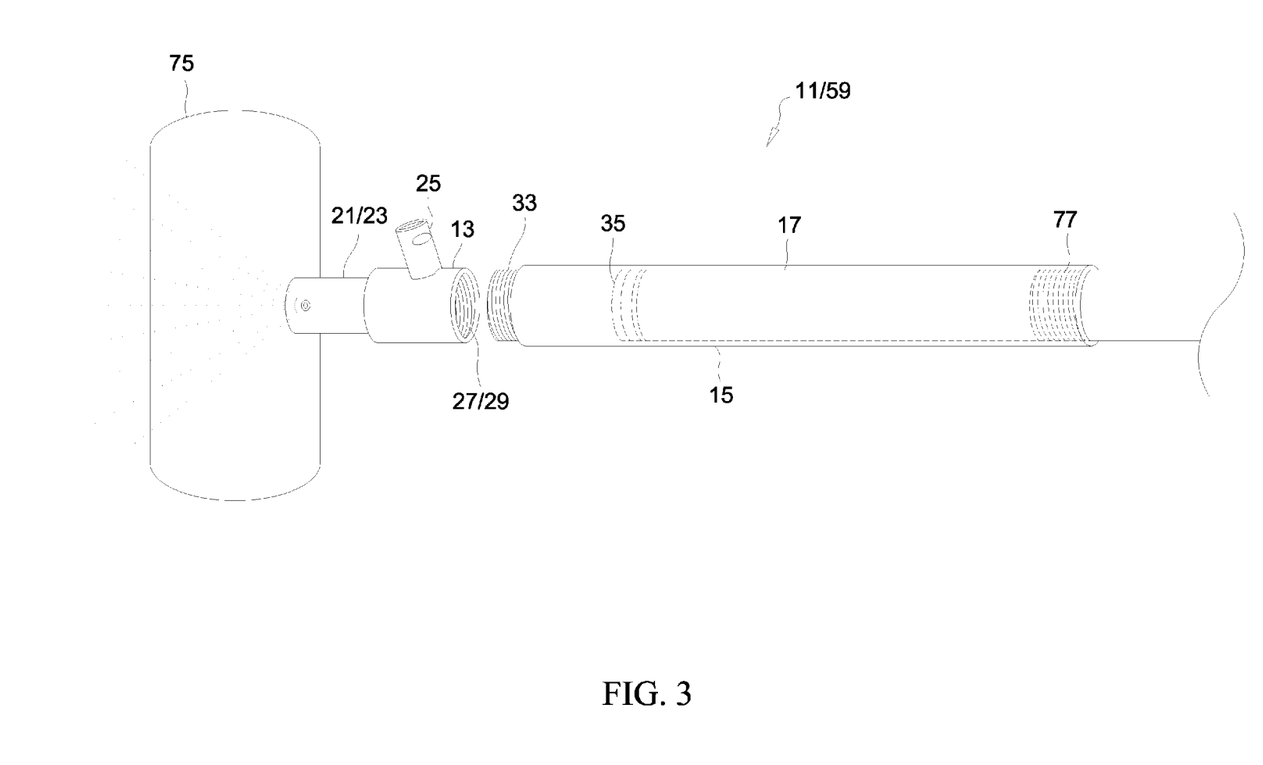
FIG. 3 shows an interchangable fluid transfer body with fixed head according to an embodiment of the present invention.
Figure 5:
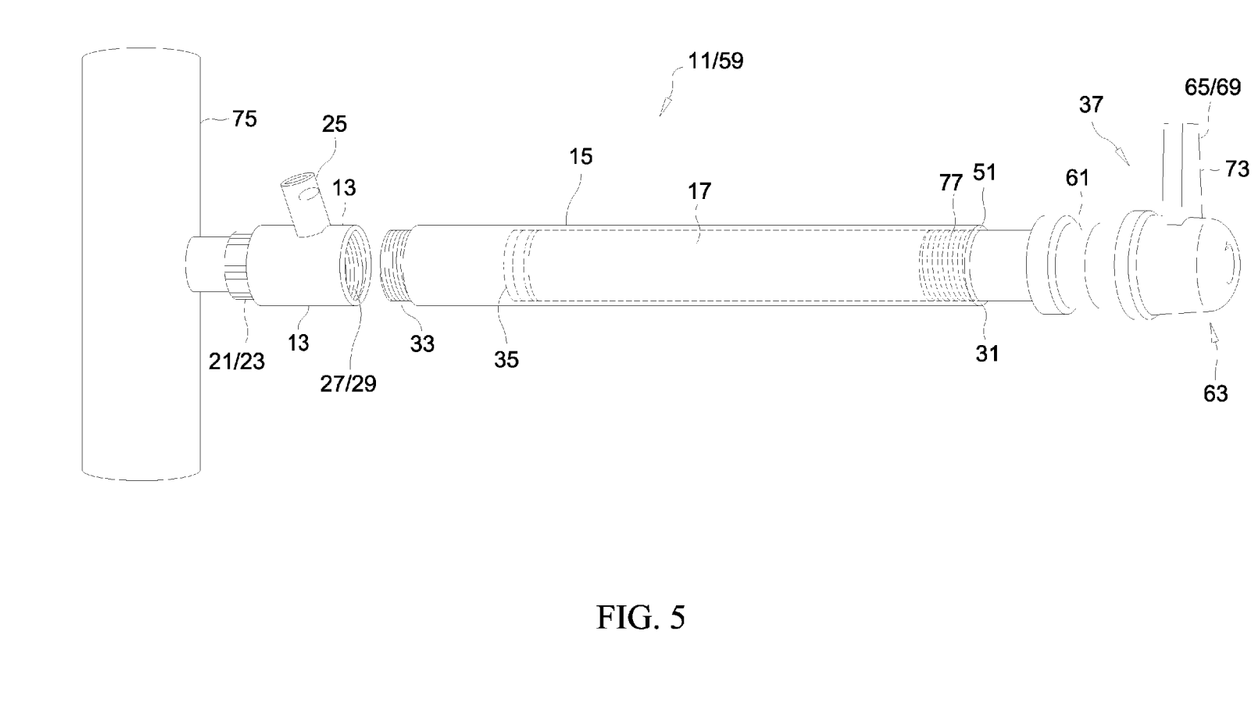
FIG. 5 shows is an exploded perspective view of the present invention shown with a helical delivery plunger having a bulb handle with a bulb-to-lever handle adapter attached.

Referring by example to FIGS. 1, 3 and 5, in some preferred embodiments of the present invention, the fluid transfer body 13 is removably connectable to enable the fluid transfer body 13 to be removed from the fluid transfer body end 33 of the reservoir 15 and replaced with an other fluid transfer body 13, or to allow the fluid transfer body 13 to be removed from the fluid transfer body end 33 of the reservoir 15 and connected with an other reservoir 15.

Figure 6:
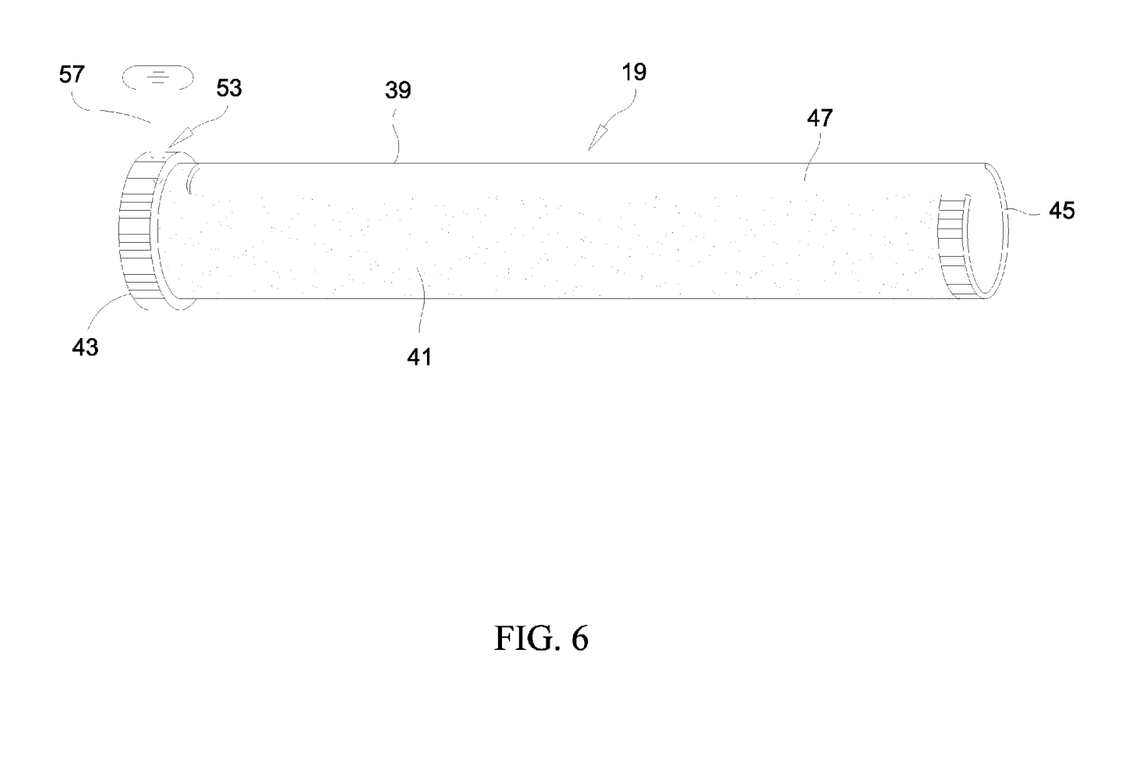
FIG. 6 shows an extender including a locking mechanism for slidably engaging the reservoir of a liquid dispenser according to an embodiment of the present invention.
Figure 7:
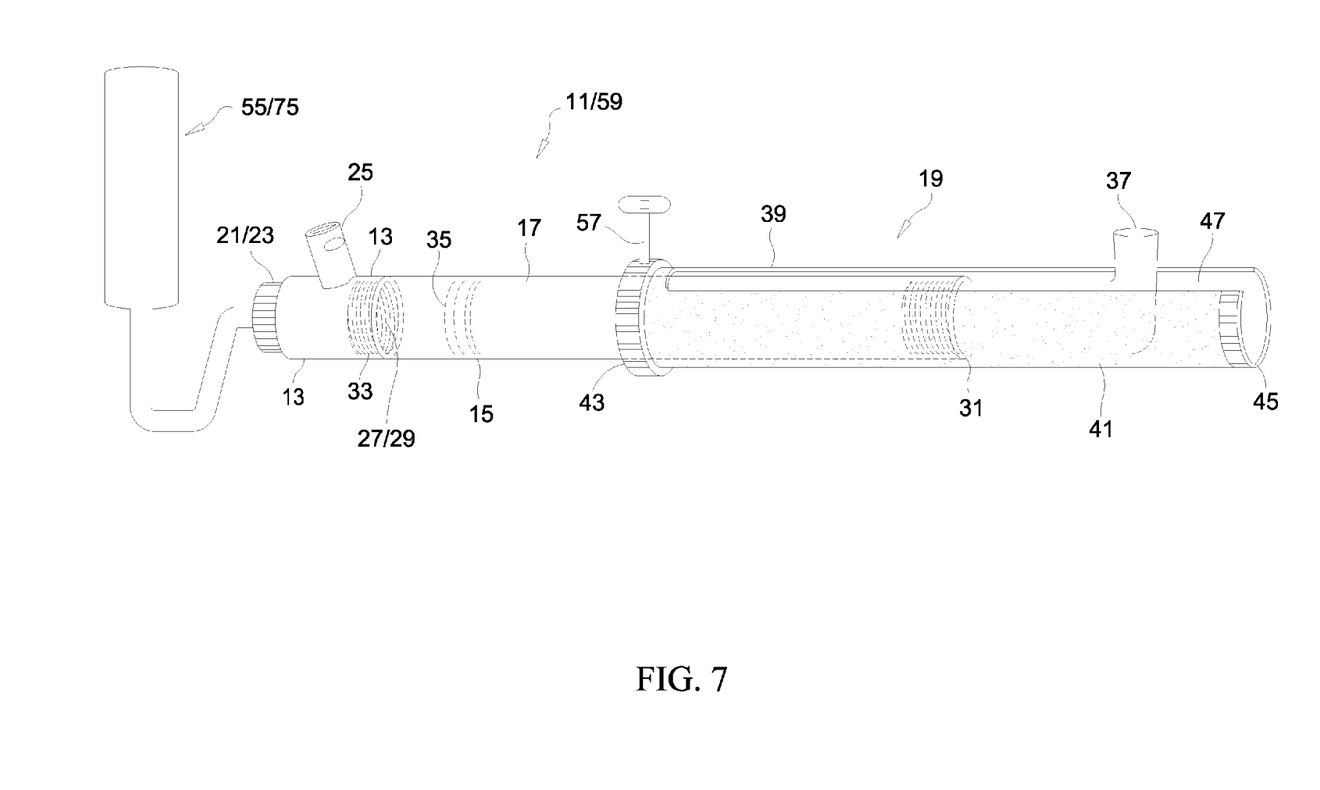
FIG. 7 shows an extender slidably engaged to a reservoir of a liquid dispenser according to an embodiment of the present invention.

Referring to FIG. 6 and FIG. 7, in some preferred embodiments of the present invention, the extender 19 slidably fits around the reservoir 15 allowing a user to selectively set or vary an extender handle length by sliding the extender 19 relative to the reservoir 15 and selectively fixing the extender 19 to the reservoir 15 by a locking mechanism 57. The locking mechanism 57 may include one or more of, a set screw, a thumb screw, threads, pop fittings bell and socket fittings, constricting collars, locking rings, gaskets, locking gaskets, and fasteners. In use with a paint stick as the liquid dispenser 11, for example, a user may selectively set a first extender handle length by sliding the extender 19 relative to the reservoir 15 and fixing the extender 19 to the reservoir 15 by a locking mechanism 57. The user may set additional handle lengths (lengthen or shorten the handle length) by releasing the locking mechanism 57 and sliding the extender 19 relative to the reservoir 15 to an other extender handle length and fixing the extender 19 to the reservoir 15 by a locking mechanism 57.

In an embodiment of the present invention, there is disclosed an extender 19 for use in extending the length of a paint stick 59 or other stick type liquid dispensing device 11 generally having an elongated tube shaped reservoir 15 in operation with a liquid delivery plunger 17 which travels within the reservoir 15 to fill the reservoir 15 with fluid and/or deliver fluid from the reservoir 15 to a head 55 (such as a roller or sprayer). The liquid delivery plunger 17 is operated by pushing and/or pulling a handle 37 that is connected to the plunger 17 at a proximal end 31 of the reservoir 15. The handle 37 extends outwardly from and is at least partially transverse to an axis occupied by the reservoir 15. The extender 19 is defined by an elongated tube shaped member 39 having at least one wall 41 forming a forward rim 43 and extending in a tubular fashion to a rearward end 45. The at least one wall 41 also forms a longitudinal slot 47 for receiving the handle 37 of the plunger 17. The slot 47 disposed to allow said handle 37 of the plunger 17 to travel towards or away from the fluid transfer body end 33 of the elongated reservoir 15 when the extender 19 is positioned over the reservoir 15 so to occupy at least part of the reservoir 15 within the at least one wall of the extender 19.

Referring to FIG. 6 by example, the liquid dispenser 11 may also include an extender 19 that has a connection 77 at the rearward end 45 for coupling the extender 19 with an extension pole to further extend a reach of the liquid dispenser. The connection 77 may be by threads, fasteners or the like as discussed herein with reference to the connector 51.

Figure 5A:
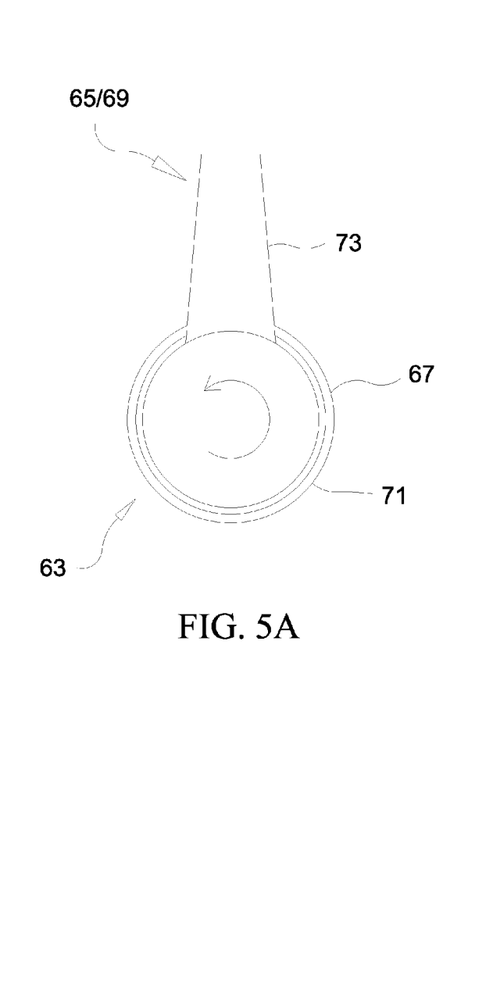
FIG. 5a shows a top view of bulb-to-lever handle adapter.
Figure 5B:
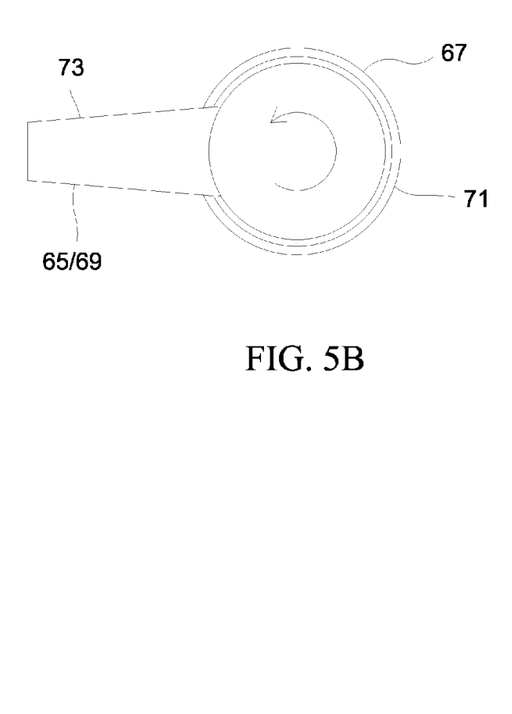
FIG. 5b shows a side view of a bulb-to-lever handle adapter according to an embodiment of the present invention.

Referring to FIGS. 5, 5a, and 5b, there is disclosed an extension kit for use in extending the length of a paint stick 59 or other stick type liquid dispensing device 11 that is operated by a user pushing and/or pulling a bulb-shaped-handle 61 that is connected to the plunger 17. The kit includes a bulb-to-lever handle adapter 63 that provides a grip 65 that protrudes outwardly from and is at least partially transverse to an axis occupied by the reservoir 15. The bulb-to-lever handle adapter 63 is for enabling operation of the plunger 17 by pushing or pulling of the grip 65 and transmitting force from the grip 65 to the bulb-shaped-handle 61. The extender 19 is as disclosed herein, or any similar device capable of achieving the same function and result.

In some preferred embodiments of the present invention the bulb-to-lever handle adapter 63 is defined by a bulb shell housing 67 formed from, connected to, or integral with a lever 69. The bulb shell housing 67 comprising a wall 71 adapted to fit over the bulb-shaped-handle 61. The lever 69 defined by a protrusion 73 that extends outwardly from the bulb shell housing 67 to extend transversely to the axis of the plunger 17 and reservoir 15. In an embodiment, the bulb shell housing 67 is disposed to rotate relative to the bulb shaped handle 67, to translate helical twisting motion of the plunger 17 to the pushing/pulling linear motion of the grip 65 of the bulb-to-lever handle adapter 63.

What is claimed is:

1. A liquid dispenser which comprises:
   a fluid transfer body having a head end for delivering fluid at a distal end, a side inlet for filling the liquid dispenser with a fluid, and a reservoir end at a proximal location for attaching the fluid transfer body with a reservoir and for communicating fluid in and out of the reservoir;
   the reservoir being an elongated tube shaped reservoir having a proximal end and an opposing fluid transfer body end, said elongated tube shaped reservoir in fluid communication with the fluid transfer body at the reservoir end;
   a plunger having a fluid contacting end connected to a handle, the fluid contacting end adapted to sealably fit inside the elongated reservoir tube and travel within the elongated reservoir tube to a.) force fluid to the fluid transfer body when the plunger travels towards the fluid transfer body end or b.) draw fluid from the fluid transfer body when the plunger travels away from the fluid transfer body end; and
   an extender selectively attachable to the elongated reservoir defined by an elongated tube shaped member having at least one wall forming a forward rim and extending in a tubular fashion to a rearward end, and the at least one wall also forming a longitudinal slot for receiving the handle of the plunger, or a lever attached to said handle, and the slot disposed to allow said handle or lever to travel when a user pushes the handle of the plunger towards or away from the fluid transfer body end of the elongated reservoir;
   wherein fluid is drawn into the reservoir from a fluid supply through the side inlet by causing the plunger to travel away from the fluid transfer body, and wherein fluid is dispensed by causing the plunger to travel towards the fluid transfer body and out the head end.

2. The liquid dispenser of claim 1, the reservoir having a connector at the proximal end and/or the extender having a connector to enable selective attachment and removal of the extender from the elongated reservoir.

3. The liquid dispenser of claim 2, wherein the connecter is one or more of threads, set screws, pop fittings bell and socket fittings, constricting collars, locking rings, gaskets, locking gaskets, and fasteners.

4. The liquid dispenser of claim 1, further including at least one interchangeable head that is interchangeably connectable to the head end of the fluid transfer body, selected from the group consisting of a liquid dispensing brush, a liquid dispensing squeegee, a liquid dispensing mop, a paint dispensing head, and combinations thereof.

5. The liquid dispenser of claim 1, further including at least one interchangeable fluid transfer body that is interchangeably connectable to the fluid transfer body end of the reservoir, the interchangeable fluid transfer body having a head fixed to the head end and selected from the group consisting of a liquid dispensing brush, a liquid dispensing squeegee, a liquid dispensing mop, a paint dispensing head, and combinations thereof.

6. The liquid dispenser of claim 4, the fluid transfer body is removably connectable to enable the fluid transfer body to be removed from the fluid transfer body end of the reservoir and replaced with an other fluid transfer body, or to allow the fluid transfer body to be removed from the fluid transfer body end of the reservoir and connected with an other reservoir.

7. The liquid dispenser of claim 1, wherein the extender slidably fits around the reservoir allowing a user to selectively set or vary an extender handle length by sliding the extender relative to the reservoir and selectively fixing the extender to the reservoir by a locking mechanism.

8. The liquid dispenser of claim 7, the locking mechanism including one or more of, a set screw, a thumb screw, threads, pop fittings bell and socket fittings, constricting collars, locking rings, gaskets, locking gaskets, and fasteners.

9. The liquid dispenser of claim 2, wherein the connector is located at or near the forward rim.

10. The liquid dispenser of claim 1, wherein the longitudinal slot extends from near the forward rim through the rearward end.

11. The liquid dispenser of claim 2, wherein the extender has a connection at the rearward for coupling the extender with an extention pole to further extend a reach of the liquid dispenser.

12. The extender dispenser of claim 1, wherein the forward rim of the extender is continuous.

13. An extender for use in extending the length of a paint stick or other stick type liquid dispensing device generally having an elongated tube shaped reservoir in operation with a liquid delivery plunger which travels within the reservoir to fill the reservoir with fluid and/or deliver fluid from the reservoir to a head, wherein the liquid delivery plunger is operated by pushing and/or pulling a handle that is connected to the plunger at a proximal end of the reservoir, and wherein the handle extends outwardly from and is at least partially transverse to an axis occupied by the reservoir, the extender defined by an elongated tube shaped member having at least one wall forming a forward rim and extending in a tubular fashion to a rearward end, and the at least one wall also forming a longitudinal slot for receiving the handle of the plunger, and the slot disposed to allow said handle to travel of the plunger to travel towards or away from the fluid transfer body end of the elongated reservoir, when the extender is positioned over the reservoir so to occupy at least part of the reservoir within the at least one wall of the extender.

14. The extender of claim 13, further including a locking mechanism slidably engaging the reservoir allowing a user to selectively set or vary an extender handle length by sliding the extender relative to the reservoir and selectively fixing the extender to the reservoir.

15. The extender of claim 13, wherein the forward rim is continuous.

16. An extension kit for use in extending the length of a paint stick or other stick type liquid dispensing device generally having an elongated tube shaped reservoir in operation with a liquid delivery plunger which travels within the reservoir to fill the reservoir with fluid and/or deliver fluid from the reservoir to a head, wherein the liquid delivery plunger is operated by a user pushing and/or pulling a bulb-shaped-handle that is connected to the plunger at a proximal end of the reservoir, the kit including:
- a bulb-to-lever handle adapter providing a grip that protrudes outwardly from and is at least partially transverse to an axis occupied by the reservoir to enable operation of the plunger by pushing or pulling of the grip and transmitting force from the grip to the bulb-shaped-handle, and
- an extender defined by an elongated tube shaped member having at least one wall forming a forward rim and extending in a tubular fashion to a rearward end, and the at least one wall also forming a longitudinal slot for receiving the grip, and the slot disposed to allow said grip to travel when a user pushes the handle of the plunger towards or away from the fluid transfer body end of the elongated reservoir, when the extender is positioned over the reservoir so to occupy at least part of the reservoir within the at least one wall of the extender.

17. The extension kit of claim 16, the bulb-to-lever handle adapter defined by a bulb shell housing formed from, connected to, or integral with a lever; the bulb shell housing comprising a wall adapted to fit over the bulb-shaped-handle; and the lever defined by a protrusion that extends outwardly from the bulb shell housing.

18. The kit of claim 16, the extender further including a locking mechanism slidably engaging the reservoir allowing a user to selectively set or vary an extender handle length by sliding the extender relative to the reservoir and selectively fixing the extender to the reservoir.

19. The extension kit of claim 16, wherein the forward rim of the extender is continuous.

* * * * *